United States Patent [19]

Johnston

[11] Patent Number: 4,483,073
[45] Date of Patent: Nov. 20, 1984

[54] HI JUMP STEP SAVER STANDARD

[76] Inventor: David F. Johnston, P.O. Box 15377, Riyadh, Saudi Arabia

[21] Appl. No.: 402,925

[22] Filed: Jul. 29, 1982

[51] Int. Cl.³ .............................................. G01B 3/56
[52] U.S. Cl. .................................. 33/1 LE; 33/1 MP; 33/1 N; 33/137 R; 272/102
[58] Field of Search ................ 33/169 R, 413, 1 MP, 33/1 N, 1 LE, 137 R, 138, 1 H:1 CC; 272/102, 103

[56] References Cited

U.S. PATENT DOCUMENTS

| | | | |
|---|---|---|---|
| 1,033,964 | 7/1912 | Tothill | 272/103 |
| 1,146,843 | 7/1915 | Brown | 272/103 |
| 2,586,074 | 2/1952 | Memluck | 33/1 LE |
| 2,770,042 | 11/1956 | Hone | 33/1 LE |
| 2,872,733 | 2/1959 | Chew | 33/1 LE |

Primary Examiner—William D. Martin, Jr.
Attorney, Agent, or Firm—Cushman, Darby & Cushman

[57] ABSTRACT

A measuring device for use with hi-jump standards to aid jumpers in determining their in-run starting points approaching the high jump in practice or in competition. The device includes a base member having a 0 to 180 degree scale, whose end points are parallel with the cross-bar, together with a swivable arm that can be set at the desired angle. The arm includes a measuring tape attachment point so that once the angle is set, a measuring tape can be used to determine the exact starting point. The device can be integrally formed with a standard or be separately attachable to a standard.

7 Claims, 5 Drawing Figures

HI JUMP STEP SAVER STANDARD

FIELD OF THE INVENTION

This invention relates to a track and field aligning and measuring device to allow a high jumper to determine his in-run starting position with respect to the hi-jump standards.

BACKGROUND OF THE PRESENT INVENTION

While the techniques used in high jumping have changed over the years, from a straight forward approach to the more notable and now widely used Fosbery Flop, one problem that has continually confronted high jumpers is where to begin your run toward the bar. It is well known that a practiced jumper will have developed a particular approach style based upon this running speed, the length of his stride, the number of steps used to get to the bar, and from what angle he will approach the jump. These conditions also require that a particular starting point be determined each time a jumper begins jumping.

Up to now, the way high jumpers had to determine that starting point involved a fairly complicated procedure. Starting at either the right or left standard, depending on the side from which the jumper would approach the bar, a jumper would measure a line extending parallel to the cross bar a predetermined distance outwardly away from the standard. The measurement would then turn a ninety degree angle toward the front of the jump area and go out a predetermined number of feet to another point with the distance being learned by each jumper through his practice and experience in jumping. From that point, the jumper would then measure back to the standard thereby forming a triangle with the hypotenuse hopefully being of a particular length. If it was, the outer corner of the triangle away from the standard would determine the starting point for that jumper with respect to that jump. In many instances, an extremmely long tape measure would be used the jumper having pre-marked the tape at various points that would define the corners of his triangle. For any particular jumper, this process could take a number of minutes and if a number of jumpers were trying to accomplish their measurements at the same time, one can imagine the amount of confusion or problems that could develop.

While I am not aware of any patents or devices that can accomplish this, I am aware of the following U.S. patents: Teter, U.S. Pat. No. 3,668,781; Buckelew, U.S. Pat. No. 2,840,914 and Mallow, U.S. Pat. No. 2,632,925.

Teter relates to a device for laying out a baseball diamond. The device includes a flat plate on which three fixed position tape measures have been placed at predetermined angles. The two outer tapes are used to determine the location of first and third bases whereas the center tape can indicate the location of second base and the pitching mound.

Buckelew refers to a carpenter layout device for laying out the centers of studs and employs a perforated tape used to stop movement of the device at particular spots and a straight edge against which a line can be drawn representing the center of studs.

Mallow refers to a device for properly positioning lights used in photography relative to a subject and includes both horizontally and vertically disposed angular scales. The vertical scale can be rotated through a vertical plane and is used to determine the angle of lights along that vertical plane and includes an integrally mounted tape for positioning the lights at a selected distance. The horizontal scale is also moveable and is used to position lights about the subject in order to provide the type of illumination desired.

None of these, however, relate to the particular problem faced by high jumpers in determining their starting position with respect to a high jump pit.

SUMMARY OF THE PRESENT INVENTION

The present invention as disclosed herein is set forth in two embodiments, one where the device is integrally formed with each standard on both sides of the cross bar and a second embodiment where the device is in the form of an attachment that can be added to conventional standards. In each instance, a protractor-like scale is employed together with an indicator arm with the latter being horizontally movable about that scale from a point effectively positioned at the center of the standard's upright pole. The indicator arm is provided with means for holding a measuring tape and can be operated as follows. From practice, each jumper will know the angle from which he wishes to approach the bar, but he must find the exact point at which he must start his in-run. Accordingly, the jumper will adjust the indicator arm to the appropriate angle at which he wishes to approach the cross bar and fix the arm at that position. Thereafter, a tape can be attached to the indicator arm and the jumper need then only measure the length of his in-run and while citing down the tape and the indicator arm, he can easily establish his starting point in essentially a two-step procedure. Depending upon whether runners wish to approach the cross bar from either the left or the right, each standard would include the aligning and measuring device according to this invention thereby permitting a large number of jumpers to easily find their respective starting points in a very quick and easy manner.

Other objects, features, and characteristics of the present invention, as well as the methods and operation and functions of the related elements of the structure, and to the combination of parts and economies of manufacture, will become more apparent upon consideration of the following detailed description and the appended claims with reference to the accompanying drawings, all of which form a part of this specification, wherein like reference numerals designate corresponding parts in the various figures.

DETAILED DESCRIPTION OF THE PREFERRED EXEMPLARY EMBODIMENTS OF THE PRESENT INVENTION

Figure 1:
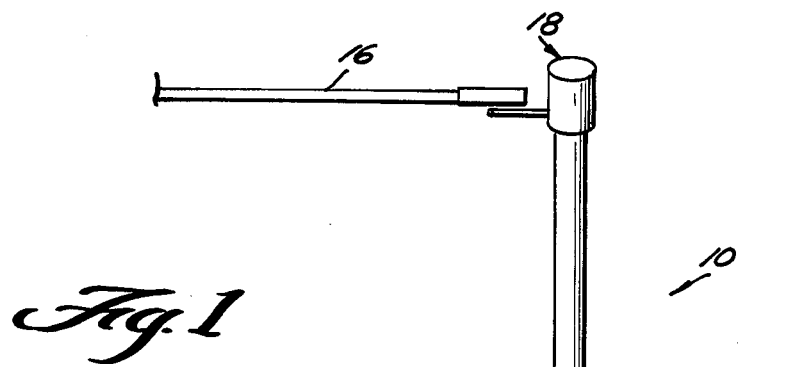
FIG. 1 shows a partial, diagrammatic view of the run side of a high jump pit including the right standard on which the present invention has been integrally formed.
Figure 2:
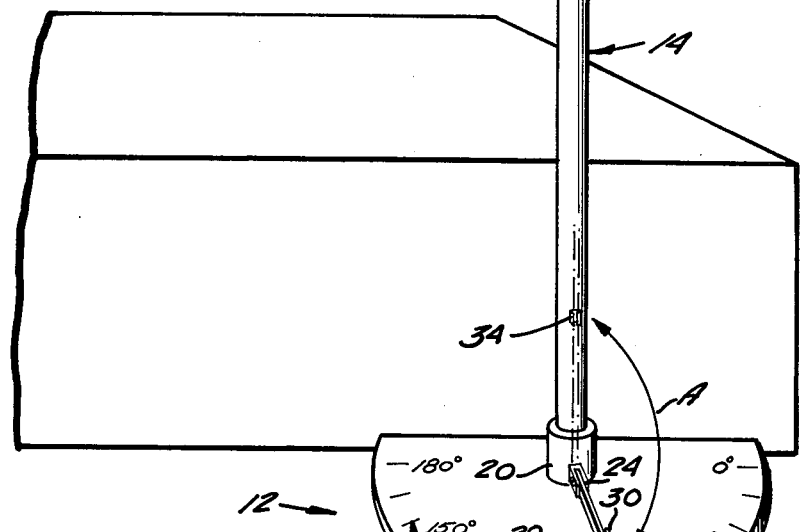
FIG. 2 is a diagrammatic, side elevational view of part of the standard shown in FIG. 1 showing the indicator arm in its used and unused positions.

Turning now to the drawings and specifically to FIGS. 1 and 2, the device according to the present invention is generally indicated at 10 and is comprised of a high jumping standard including a base member, generally indicated at 12, a vertical support member, generally indicated at 14, a cross bar 16 and a cross bar support device, generally indicated at 18 mounted on top of the vertical support member 14. Neither the cross bar 16 nor the cross bar support device 18 form part of the present invention and are, rather, conventional elements.

Vertical support member 14 is secured to base member 12 by any convenient means such as by welding or alternatively instead it could be removably secured by bolts (not shown). This vertical support member 14 is preferably circular cross-sectioned and, as will be seen in FIGS. 1 and 2, a cylindrical sleeve 20 having an internal diameter which is larger than the outer diameter of vertical member 14 is rotatably positioned over that vertical member is positioned at the base thereof and preferably in contact with or directly adjacent base member 12. In order to control rotation of sleeve 20 with respect to vertical member 14, a thumb screw 22, as shown in FIG. 2, can be provided.

A clevis member 24 is secured to sleeve 20 by any convenient means such as welding, as shown in FIG. 2, and is preferably positioned adjacent the bottom edge of sleeve 22 as shown in the drawings. A pin 26 serves to pivotally connect an indicator arm 28 to sleeve 20 so that arm 28 can pivot through a vertical plane as shown by arrows A in FIGS. 1 and 2. Arrow B in FIG. 1 indicates the horizontal rotation path through which arm 28 can be moved as permitted by sleeve 20.

Indicator arm 28 includes a tape hook 30 over which a measuring tape 32 can be attached when the device is in use. In addition, a catch 34 is positioned on vertical member 14 so as to be positioned adjacent tape hook 30 when the indicator arm is in its upright or stored position, shown in phantom in FIG. 2.

Base member 12 also includes a protractor type scale, generally indicated at 36, so that movement of indicator arm 28 along its horizontal path will serve to position that arm at any particular angle. Scale 36 preferably extends from zero degrees to 180 degrees, however, it should be understood that this scale need not be limited to these degrees. However, I have found that these are substantially all that is needed for jumpers to properly determine their approaches. The line connecting the zero and 180 degree indicators is arranged so as to be parallel with cross bar 16 or more specifically with that portion of the cross bar support device 18 which supports cross bar 16.

In use, a jumper will remove arm 28 from its stored, upright position and place it in its operative position as shown in full lines in FIGS. 1 and 2. Thereafter, the jumper will set his particular approach angle, such as 70 degrees as is shown in FIG. 1, at which point thumb screw 22 would be screwed inwardly locking sleeve 20 against vertical member 14. Thereafter, the jumper would position his tape 32 on tape hook 30 and go out his fixed distance. By citing down the tape, the tape can be easily aligned with arm 28 and at the fixed distance, a pin can be placed in the ground thus establishing the exact starting point for that jumper. Assuming the next jumper wished to approach from an angle of 45 degrees, that jumper would then reset arm 28 so that it was positioned directly above 45 degrees at which point thumb screw 22 would again fix the arm in that position. That jumper would attached his tape and measure his fixed distance arriving at his particular starting point.

Figure 3:
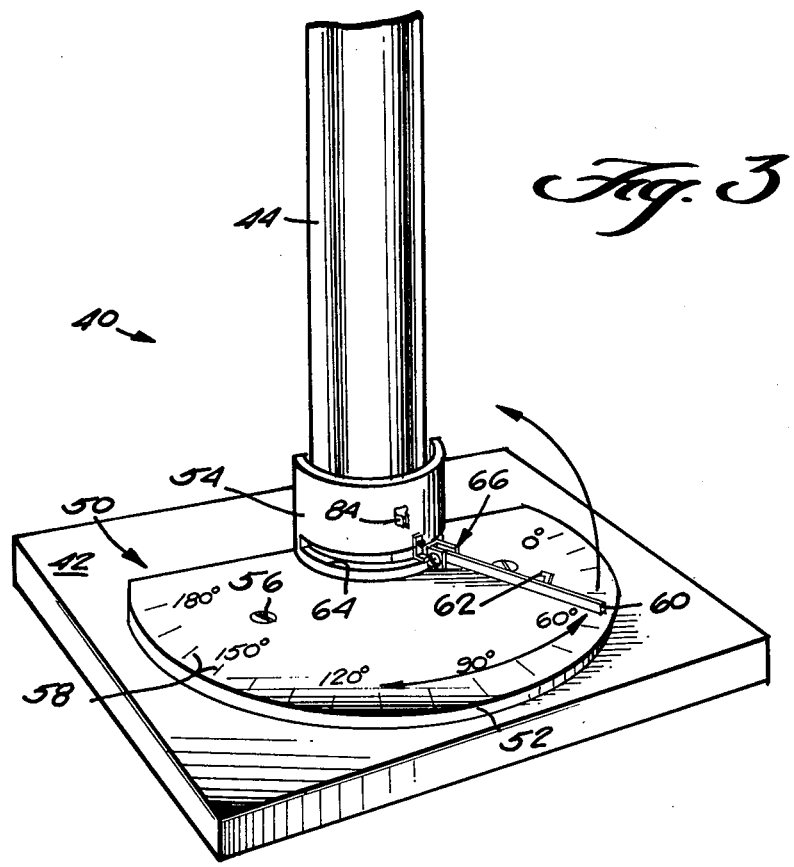
FIG. 3 is a diagrammatic perspective view of another embodiment of the present invention.
Figure 4:
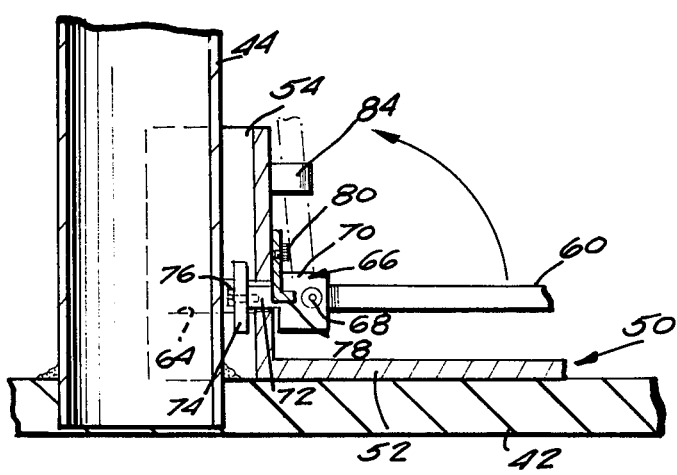
FIG. 4 is a diagrammatic, cross-sectional view of a portion of the embodiment shown in FIG. 3.
Figure 5:
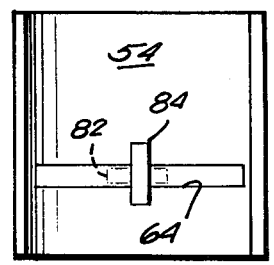
FIG. 5 is a diagrammatic rear view of an alternative indicator arm attaching mechanism.

Turning now to the second embodiment as shown in FIGS. 3-5, the lower portion of a standard is generally indicated at 40 and is comprised of a base member 42 and a vertical member 44.

The device itself in the form of an attachment or separately formed member, generally indicated at 50, and is comprised of a base section 52 and an upstanding collar section 54. As shown in the FIGS. collar 54 and base 52 can be integrally formed, such as by casting, although these two members could be separately formed and either welded, bolted or otherwise fixed together as it is only essential that they be joined in an appropriate manner to fit on the standard as shown. For example, screws 56 could be used to screw the base section 52 to the base member 42 of the standard 40. There does not need to be a connection, therefore, between upstanding collar section 54 and vertical member 44.

As with the first embodiment, the base section 52 includes a scale 58 preferably ranging from 0 to 180 degrees. As was true in the first embodiment it is important that the measuring device 50 be secured to standard 40 in such a way that a line extending through 0 and 180 degrees would be parallel to the cross bar when in place on the standard.

Likewise, the measuring device 50 includes an indicating arm 60 which is also provided with a tape hook 62.

The upstanding collar 54 is provided with a slot 64 which extends about collar 54 to an extent greater than the 0 and 180 degree marks in order to allow indicating arm 60 to be moved to all angular positions.

Arm 60 is typically retained in a support member generally indicated at 66 in FIG. 3, by means of a pin 68. Support member 66 is comprised of a clevis member 70 and a rearwardly extending arm 72 connected to the rear of and preferably integrally formed with clevis member 70. Arm 72 has a height equal to the width of slot 64 and in order to retain support member 66 within that slot 64, a rear mounting plate 74 is connected to the rear portion of arm 72 as for example by screw 76. As shown in FIG. 4, the length of arm 72 between clevis member 70 and plate 74 should be approximately as wide as the thickness of the material from which collar 54 is formed and preferably there will be only a minimum amount of play between the rear surface of clevis 70, the forward surface of plate 74 and the comparable sides of collar 54. Support member 66 also includes a bracket 78 and a thumb screw 80, as shown in FIG. 4, with bracket 78 positioning screw 80 adjacent collar 54 so that screw 80 can fix the position of support member 66 and likewise of arm 60 relative to scale 58.

As an alternative to employing support member 70, as shown in FIG. 4, which includes a removable mounting plate 74, the support member could be as shown in FIG. 5 where the rear portion of the mounting member is integrally formed with clevis 70 and arm 72 with a width dimension slightly less than slot 64, as shown in dotted lines in FIG. 5 at 82 so that the rear portion 82 could be inserted through the slot and then turned to a vertical position as shown in full line at 84 at which point the mounting connection for arm 60 would then be in place and yet able to be moved through a horizontal plane about collar 54.

Collar 54 also includes a clip 84 which again can be used to hold arm 60 in a stored vertical position in phantom in FIG. 4.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims, which scope is to be accorded the broadest interpretation so as to encompass all such modifications and equivalent structures.

What I claim is:

1. A hi-jump standard for allowing hi-jumpers to establish an approach path and starting point comprising a base, a vertical member secured to said base, means for releasably supporting an end of a cross bar, said base having an upper surface including means defining at least a predetermined portion of a circular scale with at least one end point of said predetermined portion being aligned with a line extending parallel to the cross bar support means and indicator means movably secured to said standard adjacent said base for being moved with respect to said scale for indicating a desired angle.

2. A hi-jump standard as in claim 1 wherein said indicator means including means for removably securing a measuring tape thereto.

3. A hi-jump standard as in claim 1 wherein said indicator means includes means for releasably securing said indicator means at any desired angle with respect to said cross bar.

4. A hi-jump standard as in claim 1 wherein said indicator means comprises a cylindrical sleeve rotatably secured about and coaxially aligned with said vertical member, screw means for releasably securing said sleeve at any desired point, an indicator arm pivotally secured to said sleeve so as to be movable through a vertical arc with respect to said vertical member so that said arm can be movable between a down position parallel with respect to said base and an up position parallel to said vertical member, said indicator arm including means for releasably holding the end of a measuring tape.

5. A hi-jump standard as in claim 4 wherein said sleeve includes a clevis member extending outwardly therefrom in which said indicator arm is pivotally secured.

6. A hi-jump standard as in claim 4 further including catch means for releasably securing said indicator arm in an upwardly pivoted position adjacent and substantially parallel to said vertical member.

7. A device for use with hi-jump standards having base and vertical support for releasably supporting a cross bar to set an approach path and starting point comprising a base plate having an upper surface including means defining at least a predetermined portion of a circular scale, an indicator arm, means for movably securing said indicator to said base plate so that said indicator arm is movable with respect to said circular scale and means to mount said device to a standard so that said indicator arm effectively pivots about the axis of said vertical support and at least one end of said circular scale is aligned with a line extending parallel to a cross bar when positioned on the standard.

* * * * *